United States Patent [19]

Sykes

[11] Patent Number: 5,673,632
[45] Date of Patent: Oct. 7, 1997

[54] WORKSTATION HAVING L-SHAPED WORKTOP AND FLAT-FOLDING LEGS

[76] Inventor: Christopher C. Sykes, 23, Rush Street, Woollahra, New South Wales 2025, Australia

[21] Appl. No.: 683,509

[22] Filed: Jul. 17, 1996

Related U.S. Application Data

[63] Continuation-in-part of Ser. No. 582,254, Jan. 3, 1996, abandoned.

[51] Int. Cl.⁶ ..................................................... A47B 3/00
[52] U.S. Cl. ......................... 108/121; 108/50; 312/223.6
[58] Field of Search ................................. 108/50, 64, 23, 108/129, 180, 182, 121, 132; 312/223.3, 145, 223.6; 248/188

[56] References Cited

U.S. PATENT DOCUMENTS

| | | | |
|---|---|---|---|
| 135,040 | 1/1873 | Mahan | 108/131 X |
| 4,070,075 | 1/1978 | Morgan | 108/50 X |
| 4,252,989 | 2/1981 | Blumenthal . | |
| 4,345,803 | 8/1982 | Heck . | |
| 4,354,330 | 10/1982 | Schwartz . | |
| 4,372,629 | 2/1983 | Propst et al. | 312/223.6 |
| 4,475,322 | 10/1984 | Russo et al. | 312/223.6 X |
| 4,559,877 | 12/1985 | Waibel . | |
| 4,639,049 | 1/1987 | Frascaroli et al. | 312/195 |
| 4,879,955 | 11/1989 | Moll et al. | 108/50 |
| 4,936,228 | 6/1990 | Capo-Bianco | 108/64 |
| 4,974,913 | 12/1990 | Vogt et al. | 312/195 |
| 5,094,174 | 3/1992 | Grund et al. | 108/50 |
| 5,129,715 | 7/1992 | Maynard, Jr. . | |
| 5,154,126 | 10/1992 | Newhouse et al. | 108/50 |
| 5,220,871 | 6/1993 | Grund et al. | 108/50 |
| 5,226,705 | 7/1993 | Rorke et al. | 108/50 X |
| 5,318,259 | 6/1994 | Fussler | 108/50 X |
| 5,337,657 | 8/1994 | Diffrient | 108/50 X |
| 5,394,809 | 3/1995 | Feldpausch et al. | 108/50 X |
| 5,435,254 | 7/1995 | Amey et al. . | |
| 5,437,235 | 8/1995 | Randolph . | |
| 5,490,467 | 2/1996 | Diffrient | 108/129 X |
| 5,544,593 | 8/1996 | Canfield et al. | 108/50 |

FOREIGN PATENT DOCUMENTS

| | | | |
|---|---|---|---|
| 0 453 392 A | 10/1991 | European Pat. Off. . | |
| 2 582 922 A | 12/1986 | France . | |
| 2 649 598 | 1/1991 | France . | |
| 2 700 254 A | 7/1994 | France . | |
| 2916002 | 11/1980 | Germany | 312/223.6 |
| 93 13 748 U | 12/1993 | Germany . | |
| 8100965 | 4/1981 | WIPO | 312/223.6 |

Primary Examiner—Jose V. Chen

[57] ABSTRACT

A workstation has a one piece sheet form L shape worktop. A central leg hinges to a lower side of the worktop adjacent an outer apex of the L and rocks between a stored position extending diagonally across the lower side toward an inner corner of the L and an erected position extending downwardly from the worktop. An end leg hinges to the lower side adjacent each end of the L shape and rocks between a stored position extending longitudinally across the lower side toward a central portion of the L shape and an erected position extending downwardly from the worktop. Latch rods secure the legs in erected positions. An upstanding column member of hollow rectangular cross-section delivers power and data to the workstation. An outer corner of the worktop is truncated and provides a recess having an oblique edge to accommodate a side of the column member. The column member may comprise two L-section extruded pieces of which an intermediate section hinges between an open position revealing power and data receptacles and a closed position in which an edge of the hinging section snap closes on a stationary L-section piece.

24 Claims, 10 Drawing Sheets

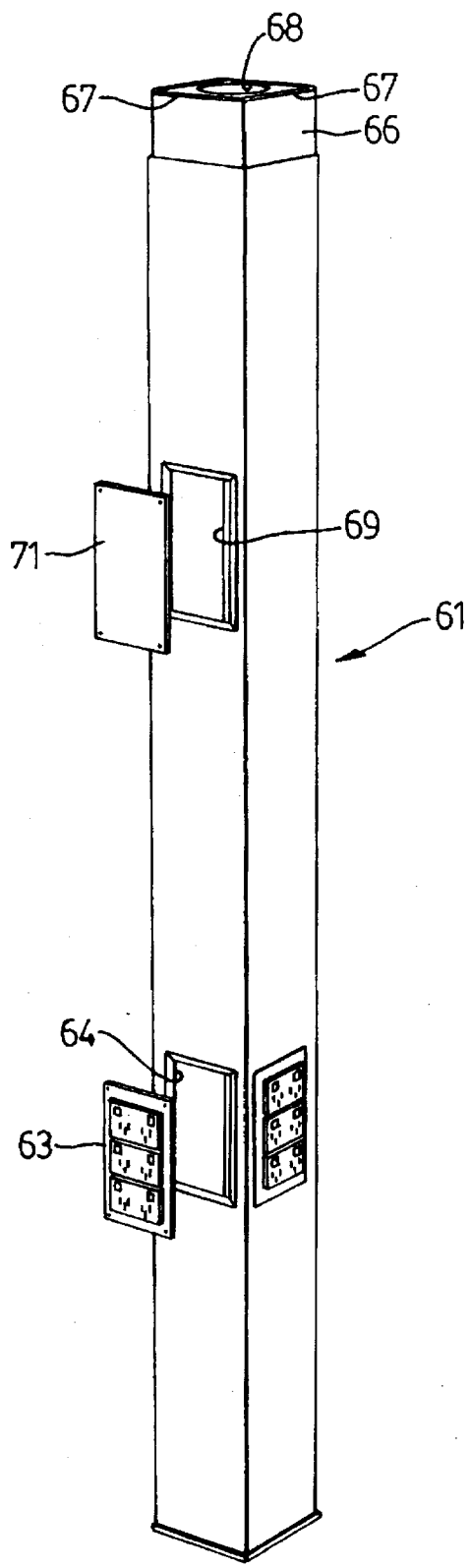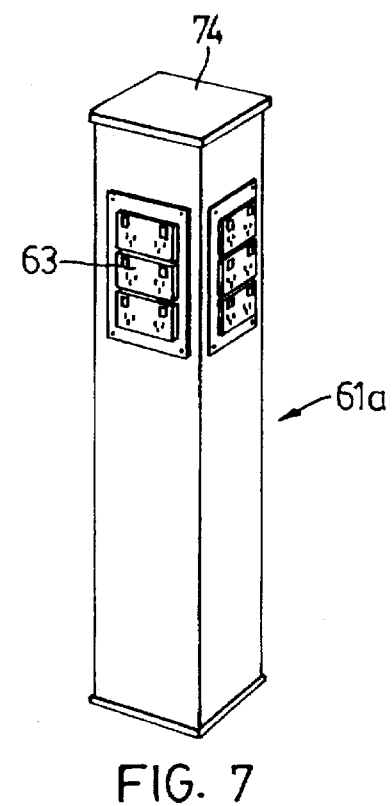
FIG. 6
FIG. 7

WORKSTATION HAVING L-SHAPED WORKTOP AND FLAT-FOLDING LEGS

This application is a continuation-in-part of patent application Ser. No. 08/582 254 filed Jan. 3 1996 now abandoned.

The present invention relates to a workstation, for example for use in offices or the like.

Known desks and workstations suffer from the disadvantage that they are of relatively complex construction, and normally require special tools, hardware, and the services of specially trained staff for assembly, disassembly, installation, or reinstallation at a new location. Usually, also, known workstations tend to be excessively bulky and heavy, so that the workstation cannot normally be moved by one person alone.

According to the present invention, there is provided a workstation comprising a one piece sheet form worktop having two limbs disposed in a general L shape, a central leg member hinged to a lower side of the worktop adjacent an outer apex of said L shape for rocking between a stored position extending diagonally across the lower side toward an inner corner thereof and an erected position extending downwardly from the worktop, an end leg member hinged to the lower side adjacent each end of each limb and each rocking between a stored position extending longitudinally across the lower side of the limb toward a central portion of said L shape and an erected position extending downwardly from the worktop, and means for securing said legs in their erected positions.

This workstation is adapted to be formed with relatively compact dimensions and to be constructed of relatively light weight material while still providing a worktop of adequate capacity in a space-efficient manner and that is readily capable of being carried without difficulty by one person. Further, the hinging mode of the legs of the workstation allows it to be reduced rapidly and compactly to a flat condition for storage or transport without the use of any tools, and without requiring separate hardware items that are prone to be misplaced in the course of a move from one location to another.

In the preferred form, the workstation is employed in combination with an upstanding column member of hollow rectangular cross-section for delivery of power and data, and the outer apex of the worktop is truncated and provides a recess having an oblique edge for accommodating a side of the column member.

The invention is more fully described, by way of example only, with reference to the accompanying drawings in which FIG. 1 is a partially exploded view of a workstation and power and data delivery column member in accordance with the invention.

FIGS. 6 and 7 are isometric views illustrating first and second forms of column member, respectively.

Figure 1:
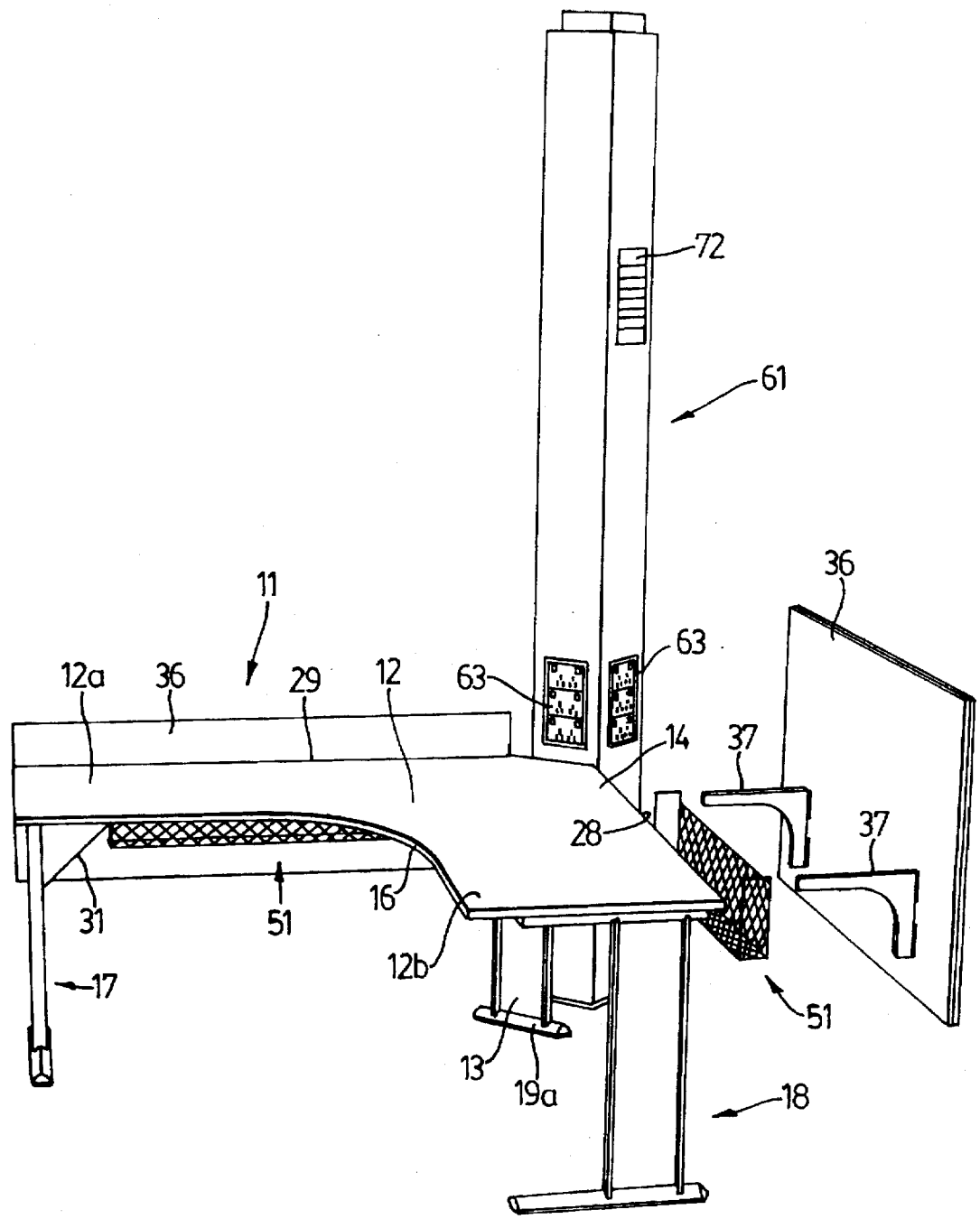

Referring to the drawings, a workstation 11 comprises a one-piece sheet form worktop 12 having two limbs 12a and 12b disposed in a general L-shape. The desktop may be formed of any board-like sheet material providing adequate strength properties, and that is preferably readily machinable using routing devices and the like, so that its edges can be readily shaped. Examples of suitable materials include wood, chipboard and various other particle board and fiberboard materials well known to those skilled in the art and typically formed of bonded wood or other cellulosic particle or fiber products. A preferred material is Melamine faced MDF (medium density fiberboard).

Figure 2:
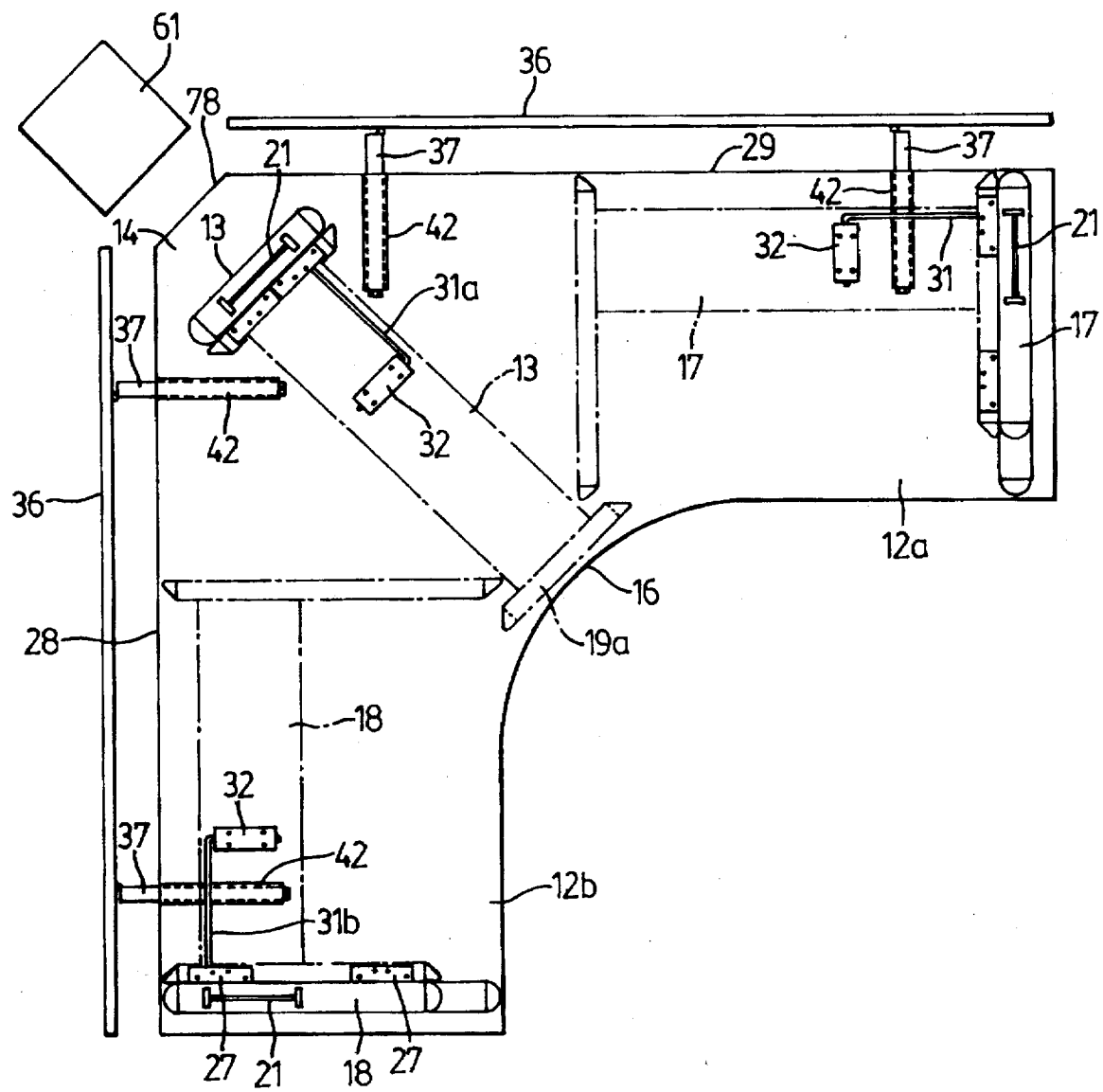
FIG. 2 is a view from underneath of the workstation of FIG. 1, and showing in broken lines portions of the workstation in folded condition.
Figure 3:
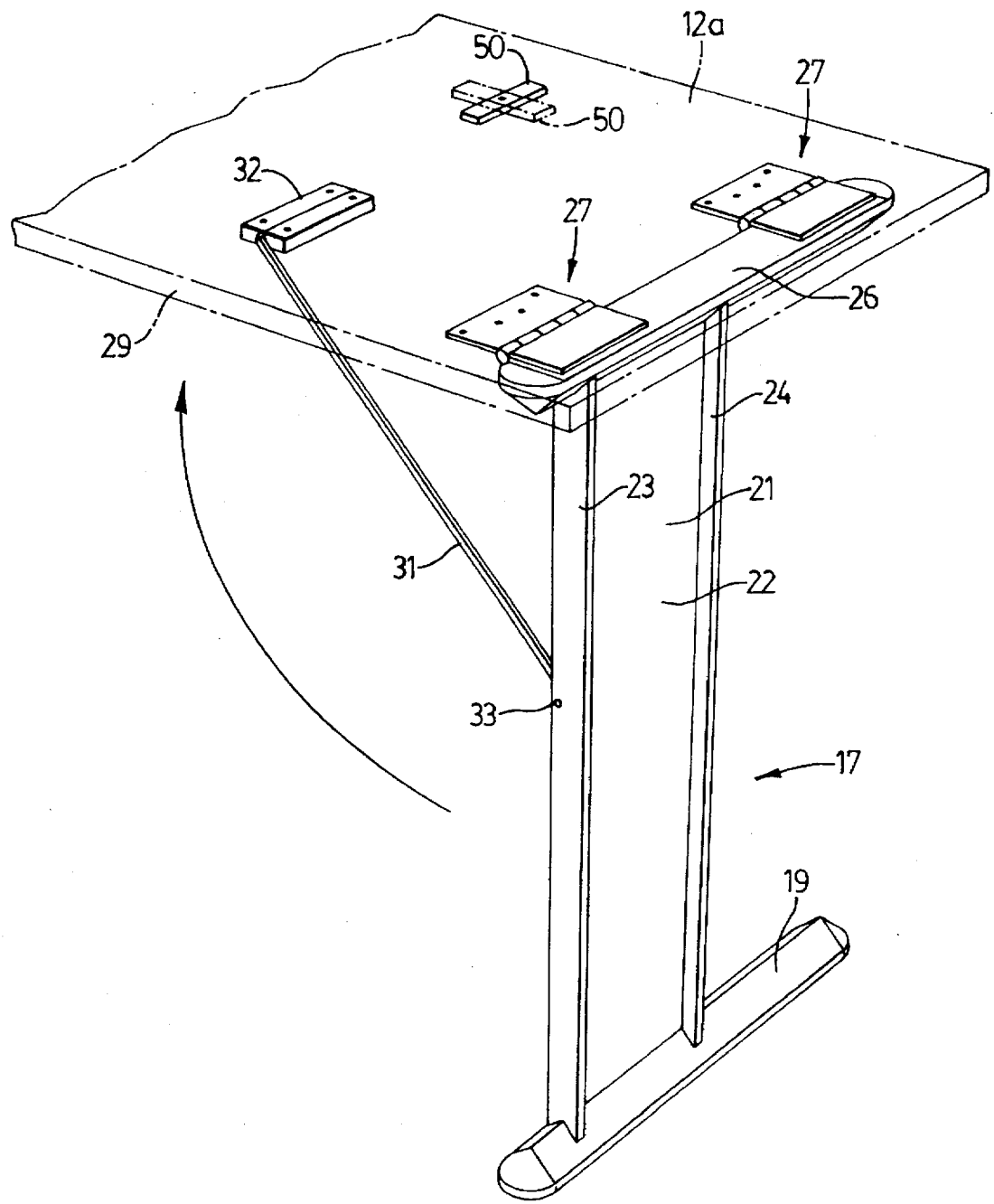
FIG. 3 is a perspective view on an enlarged scale of a leg member of the workstation.

A central leg 13 is hinged to a lower side of the worktop 12 adjacent an outer apex 14 of the L-shape for rocking between a stored position as shown in broken lines in FIG. 2 extending diagonally across the lower side toward an inner corner 16 and an erected position, shown in solid lines in FIGS. 1 to 3 extending vertically downwardly from the worktop 12. End leg members 17 and 18 are hinged to the lower side of the worktop 12 adjacent each end of each limb 12a and 12b and each rock between a stored position shown in broken lines in FIG. 2 extending longitudinally across the lower side of the limb 12a or 12b toward a central portion of the L-shape and an erected position, shown in solid lines in FIGS. 1 to 3 extending downwardly from the worktop.

FIG. 3 shows the structure of one of the legs 17 in more detail. As seen in FIG. 3, the leg 17 comprises a foot portion 19 that is desirably the width of the limb 12a to provide stability. A shaft portion 21 is secured on the foot portion 19. In the preferred form, as shown in FIG. 3, the shaft portion 21 comprises an I-section extrusion having a central web 22 and end flanges 23 and 24. A capital portion 26, similar to the foot portion 19 in structure is secured to the upper end of the shaft 21. In the example shown, two butt hinges 27 hinge the capital portion 26 to the underside of the portion 12a.

Leg 18 is generally similar to leg 17. As seen in FIGS. 1 to 4, the shaft portions 21 of the legs 17 and 18 are preferably off-set toward the outer sides 28 and 29 of the worktop 12 in order to provide increased knee room for the user.

The central leg 13 may have a foot portion 19a of reduced Width as compared with the foot portion 19, and the shaft 22a is disposed centrally with respect to the foot portion 19a.

Latches or the like are provided for securing the legs 13, 17 and 18 in their erected positions. In the example illustrated, the latch is in the form of a rod 31 having at its upper end a laterally directed limb (not shown) which is hinged to rotate about an axis parallel to and spaced from the axis of the hinges 27 within a support 32 secured to the underside of the worktop 12. The lower end of the rod 31 has a lower limb directed laterally in a direction opposite from the upper limb, the end of which may be lodged in a circular opening 33 in one flange 23 of the shaft 21 when the leg is lowered to the erected position as seen in FIG. 3, so that the rod 31 serves as a prop-like latch retaining the leg 17 in the erected condition. Legs 13 and 18 are provided with similar securing latch rods 32a and 32b.

In use, the workstation may be simply installed by folding the legs 13, 17 and 18 downwardly from the stored position shown in broken lines in FIG. 2 to the position shown in solid lines in FIGS. 1 to 4 and manipulating the latch rods 32, 32a and 32b to secure the legs in their downwardly extending position. Similarly, to fold the workstation to the flat condition, the latch rods 31, 31a and 31b may be detached from their respective openings 33 at the lower end with light finger pressure and the legs swung upwardly to the stored position shown in FIG. 2 for the purposes of transport or storage.

The worktop 12 is adapted to be formed to relatively small dimensions, while still providing ample space on its upper surface for accommodating office equipment such as typewriters, computers CPUs, monitors, keyboards and the like, the outer portion adjacent the apex 14 providing ample space for accommodating a CPU and monitor or the like. Preferably, as shown, the inner corner 16 is concavely arcuate and merges smoothly with the inner sides of the limbs 12a and 12b. The workstation is adapted to be formed of relatively light weight materials, and hence, with the legs in the folded or stored position, the workstation may be readily carried by one person.

Figure 4:
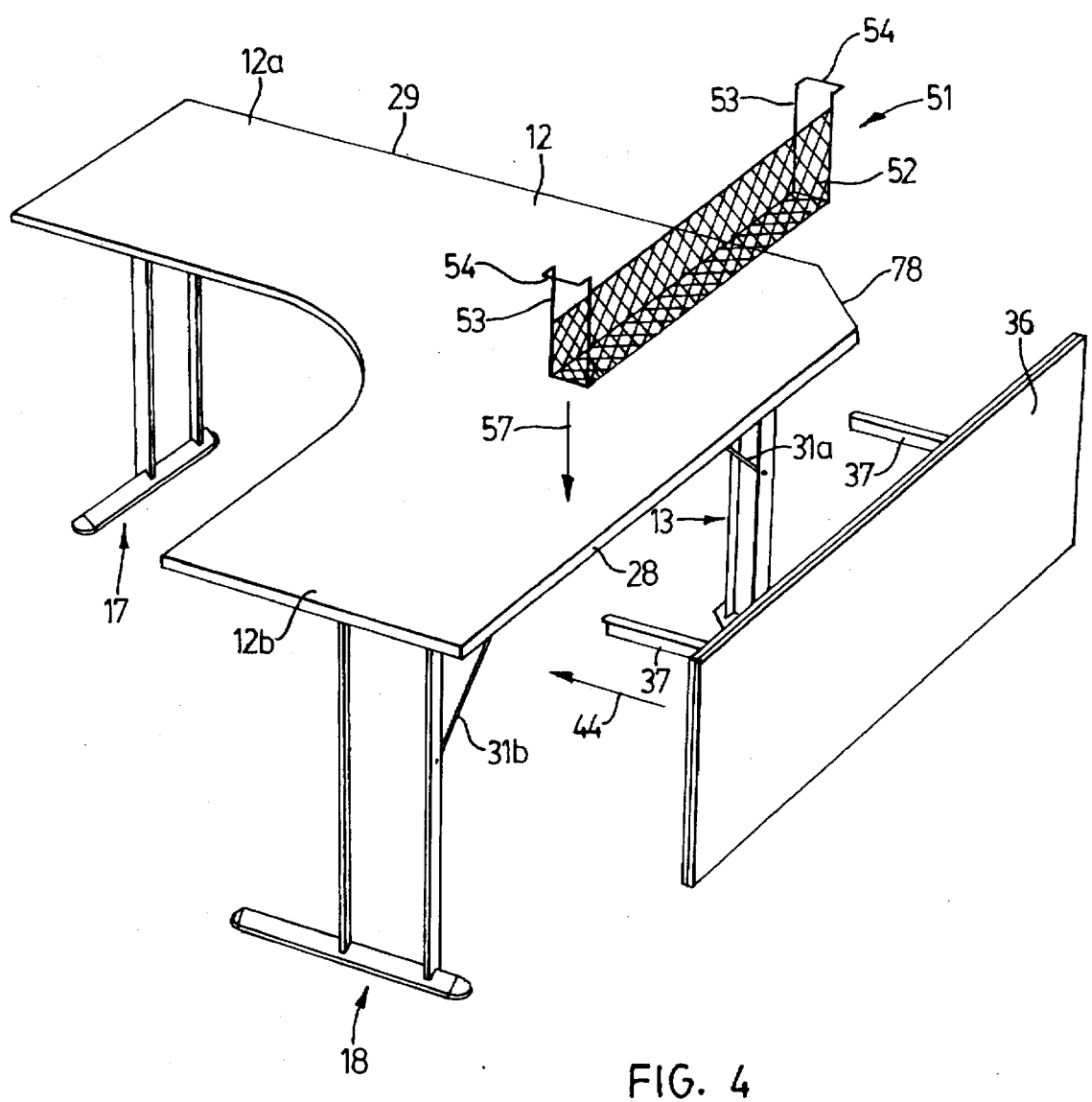
FIG. 4 is an isometric view of the workstation illustrating installation of a cable dump basket and panel member on the workstation.
Figure 5:
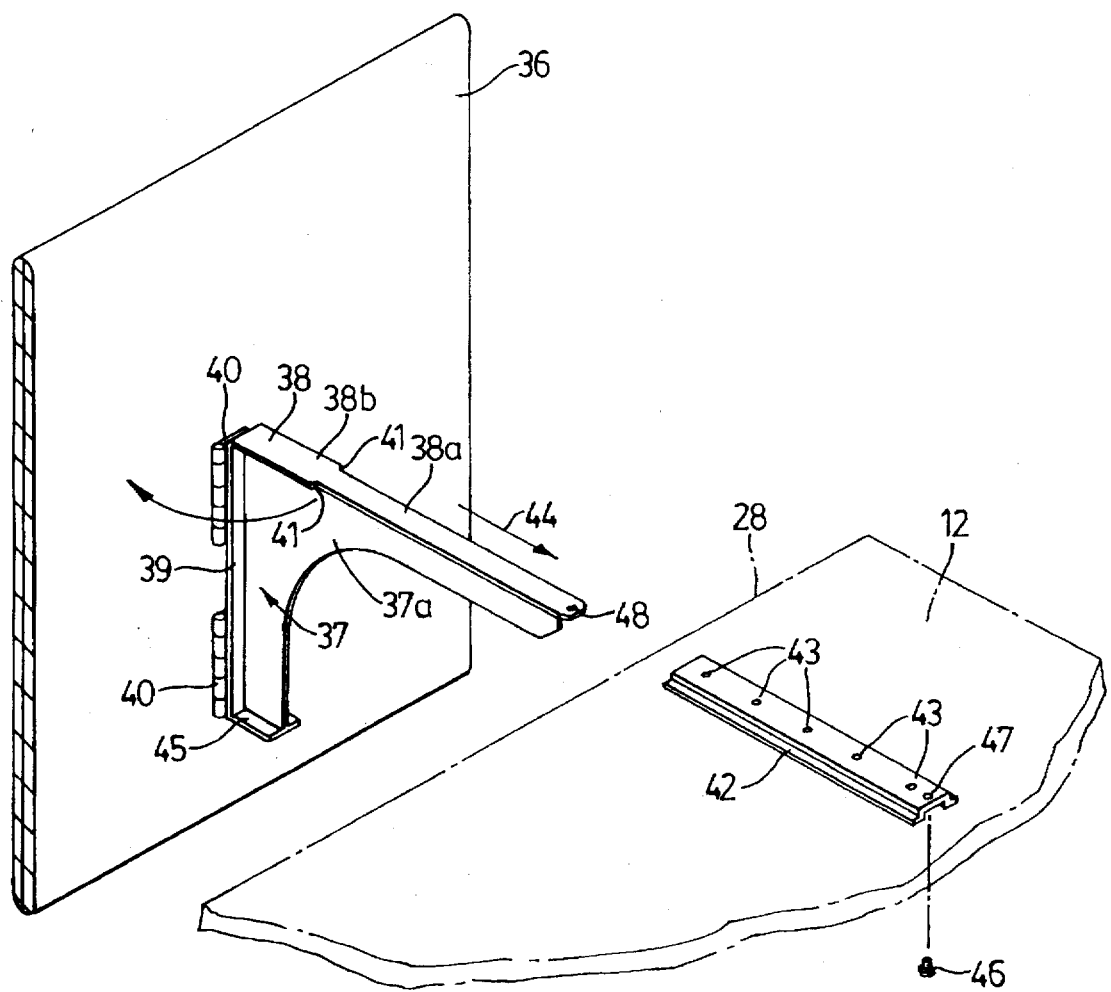
FIG. 5 is a partial isometric view on an enlarged scale illustrating the mounting of the panel on the workstation.

FIGS. 2, 4 and 5 show in more detail arrangements for attaching vertical rectangular panel members 36 on the outer sides 28 and 29 of the worktop. A pair of generally L-section support members 37 are hinged on each panel 36. Each support member 37 comprises a generally L-shaped plate portion 37a provided with an edge flange 38 along its upper edge and flange 39 along its rear edge to which the leaves of a pair of butt hinges 40 are secured. The other leaf of each hinge 40 is secured to the panel 36, so that the support members pivot about axes parallel to the shorter sides of the panel 36. The upper edge flange 38 comprise a narrow front portion 38a and a wider rear portion 38b, with a shoulder 41 on each side between the portions 38a and 38b. Portion 38a together with the portion 37a defines a horizontally extending T-section rail.

In the deployed position, as seen in FIGS. 4 and 5, the support members 37 are swung outwardly to extend forwardly from the panel 36.

The underside of the worktop 12 adjacent each rear edge 28 and 26 is provided with a pair of C-section rails 42, as seen in more detail in FIG. 5, the rails 42 being spaced apart to receive the members 37 in deployed position and being secured to the worktop by fasteners such as screws extending through openings 43 formed in the bottom of the channel of the C rail 42.

To install the panels 36 the T rail members 37 are engaged in the C rails 42 and slid forwardly, as indicated by arrow 44 in FIGS. 4 and 5, the forward movement being limited by the shoulders 41 engaging the end of the rail 42 to space the panels 36 rearwardly from the outer sides 28 and 29 a small distance in the installed position as seen in FIG. 2.

A releasable connector such as a screw 46 may be threaded into openings 47 and 48 in the C rail 42 and T rail 38a that are in register in the installed position to retain the T rail 38a inserted in the C rail 42. The screw 46 preferably has a knurled head so that the screw can be installed or removed by turning it with the fingers.

The panels 36 can be removed simply by removing fasteners 46 and sliding them outwardly. With the panels 36 removed, the support members 37 may be folded flat to the panels by pivoting them upwardly in the direction shown by arrow 49 in FIG. 5.

As will be appreciated, the arrangement described above may be modified in that the upper flange 38 of the support member 37 may be provided with a C-section rail such as rail 42 and the worktop 12 may have affixed to it T-section rails similar to the T-section formed by flange 38a and portion 37a.

Other arrangements are contemplated. For example, L shaped support members similar to members 37 may be hinged to the lower side of the worktop 12. The hinges occupy the position shown for the C rail 42 in FIG. 5. In the deployed position, the rear edge flanges 39 extend downwardly a short distance rearwardly of the outer side 28, that is to say the edges 39 project outwardly from side 28. C-rails similar to rails 42 are secured on the inner face of the panel 36 extending parallel to its shorter side, one of these C rails occupying the position shown for the hinges 40 in FIG. 5. There is a gap or break in the flange 38 adjacent the flange 39, allowing the panel 36 to be installed by engaging the C rails on the vertically extending T rails and sliding the panel 36 downwardly until the lower edge of the C rail engages a stop flange similar to a flange 45 shown in FIG. 5. The panels 36 can be removed by sliding them upwardly and the support members folded flat on the underside of the worktop 12 for storage or transport.

If desired, the underside of the worktop 12 may be provided with catches to retain the legs 13, 17 and 18 in the upwardly folded or stored condition. For example, adjacent each leg a swivel catch 50 may be mounted to the lower side of the worktop 12 and swivelling about a vertical axis between the position shown in broken lines in FIG. 3 and the position shown in solid lines in FIG. 3, wherein the catch 50 extends beneath a portion of the leg 17 and retains it in the upwardly folded or stored position. Similar catches may be provided on the panels 36 and to engage with the support members 37 in stored position.

FIGS. 1 and 4 show cable dump baskets 51 that are adapted to be suspended between an adjacent pair of the support members 37 in their deployed position.

As best seen in FIG. 4, the dump basket may comprise a rectangular trough-shape wire frame basket structure 52 having wire end frame members 53 the upper ends of which are bent over to form longitudinally outwardly extending ears 54. After installation of the panel 36 as indicated by the arrow 44 in FIG. 4, the cable dump basket 51 may be simply lowered into position as shown by the arrow 57 in FIG. 4 so that the outwardly extending ears 54 rest on the deployed support members 37. The cable dump baskets 51 may be used for holding cables attached to monitors, CPUs, printers, and the like, to retain these cables adjacent the workstation in a position in which they are stored neatly out of sight behind the panels 36.

Most advantageously, the workstation 11 is used in combination with an upstanding hollow column member of rectangular, preferably square cross-section, as seen in FIGS. 1, 2, 6, 7 and 8.

Figure 8:
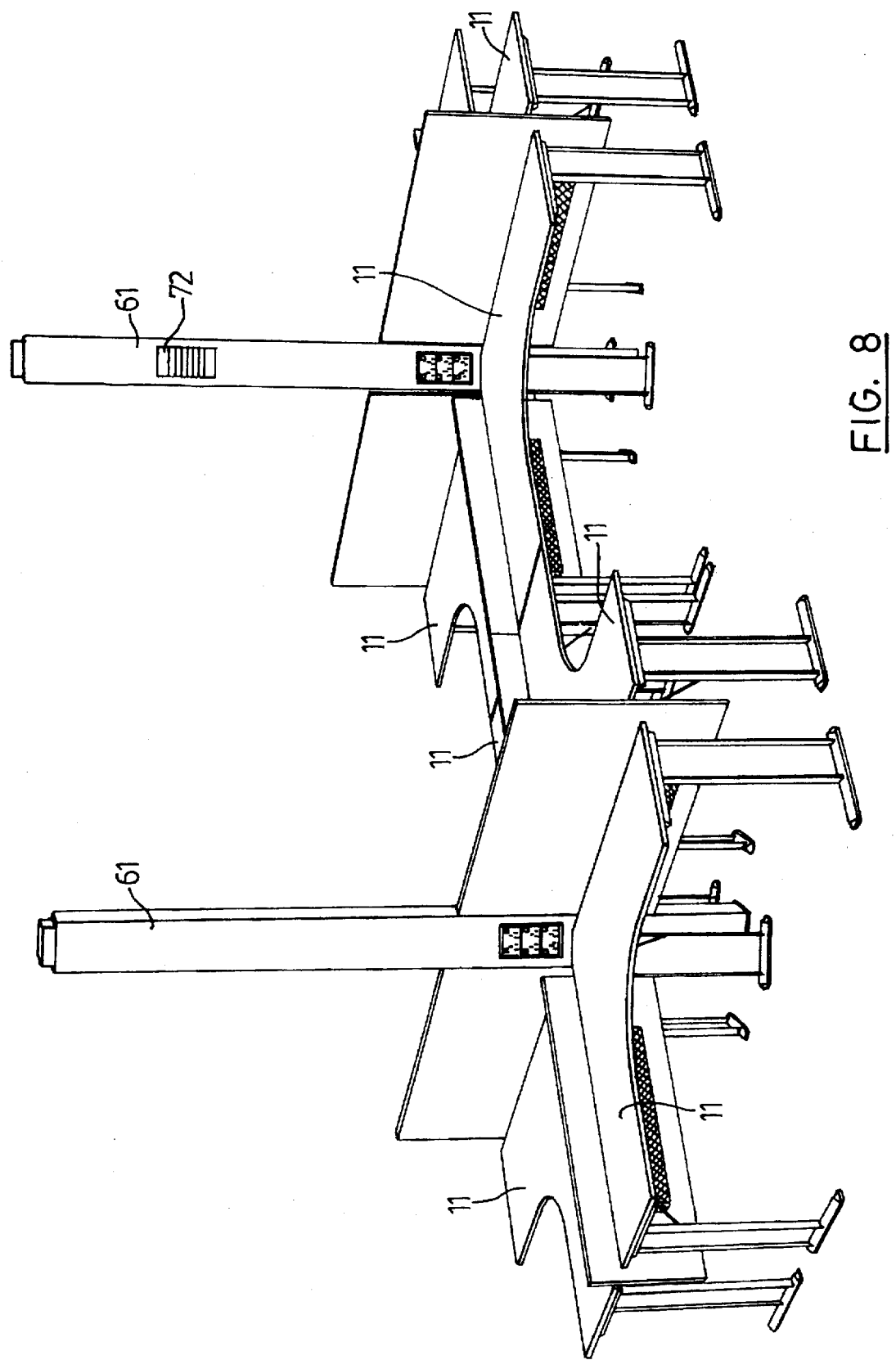
FIG. 8 is an isometric view showing an eight station cluster formed from workstations in accordance with the invention.

In one form the column member may be a full height column 61 as shown in FIGS. 1, 6 and 8 intended to reach to the ceiling, and may be formed for example from bent sheet metal, and is preferably pre-wired for power and data to be supplied to the workstation through standard receptacles 63 that snap into corresponding rectangular recesses 64 formed in the member 61. These are positioned so that they are slightly above the height of the worktop 12 when the column member 61 is disposed on a floor surface adjacent the workstation 11, as seen in FIG. 1.

In one preferred form, the column member 61 is used in association with a rectangular section tube-like chimney 66 that telescopes within the upper end of the column member 61, as seen in FIG. 6. The chimney member 66 has outwardly extending flanges 67 at its upper end, so that the chimney member may be installed with the flanges 67 resting on the upper surface of a ceiling tile or like panel-form ceiling member. Power and data cables may then be run downwardly from the ceiling space through an upper opening 68 in the chimney member 66 to connect with connector blocks pre-wired into the member 61. It is also possible to run cables up from the floor to the interior of the column 61, so that the full height member 61 may be used to deliver floor and/or ceiling fed power and data.

In addition to the openings 64 the member 61 may have upper side openings 69, normally closed by covers 71, through which access can be had to the interior of the column to assist in wiring installation. The covers 71 may be louvred plates 72 that snap-fit into the openings 69. The gap between the chimney 66 and the upper portion of the column member 61 may if desired be closed by a simple sealing baffle and the column member 61 used for delivery of HVAC (heating, ventilating and air conditioning), such HVAC air being delivered downwardly into the column member 61 through conventional HVAC outlets connecting to the openings 68 in the region of the ceiling space, and flowing outwardly into the workplace through the louvres of plates 72.

It will be appreciated that the column member 61, similar to the workstation 11 is adapted to be installed and removed without use of tools, and may be readily carried by one pair of hands.

FIG. 7 shows a modified or desk height form of column member 61a, similar to member 61 except its height is such that it extends a short distance above the desk top 12. The upper end of the member 61 is capped with a square cap 74. The member 61a may in use be placed immediately above and be connected to a node in a floor power and data grid and the receptacles 63 are connected to the floor fed power and data in a manner similar to that described for the full height column member 61 described above.

In the preferred form, as best seen in FIGS. 1 and 2, the apex 14 of the worktop 12 is truncated to provide a recess having an oblique edge 78 for accommodating a side of the column member 61 inclined obliquely or diagonally with respect to the end sides 28 and 29 of the worktop 12.

The arrangement as seen in FIGS. 1 and 2 is especially advantageously employed as a module on which multiple workstation layouts may be based, one example of which is seen in FIG. 8, wherein eight of the workstations 11 and two column members 61 are employed. As will be appreciated by those skilled in the art, numerous other multiple workstation layouts can be constructed using the basic module seen in FIGS. 1 and 2.

Figure 9:
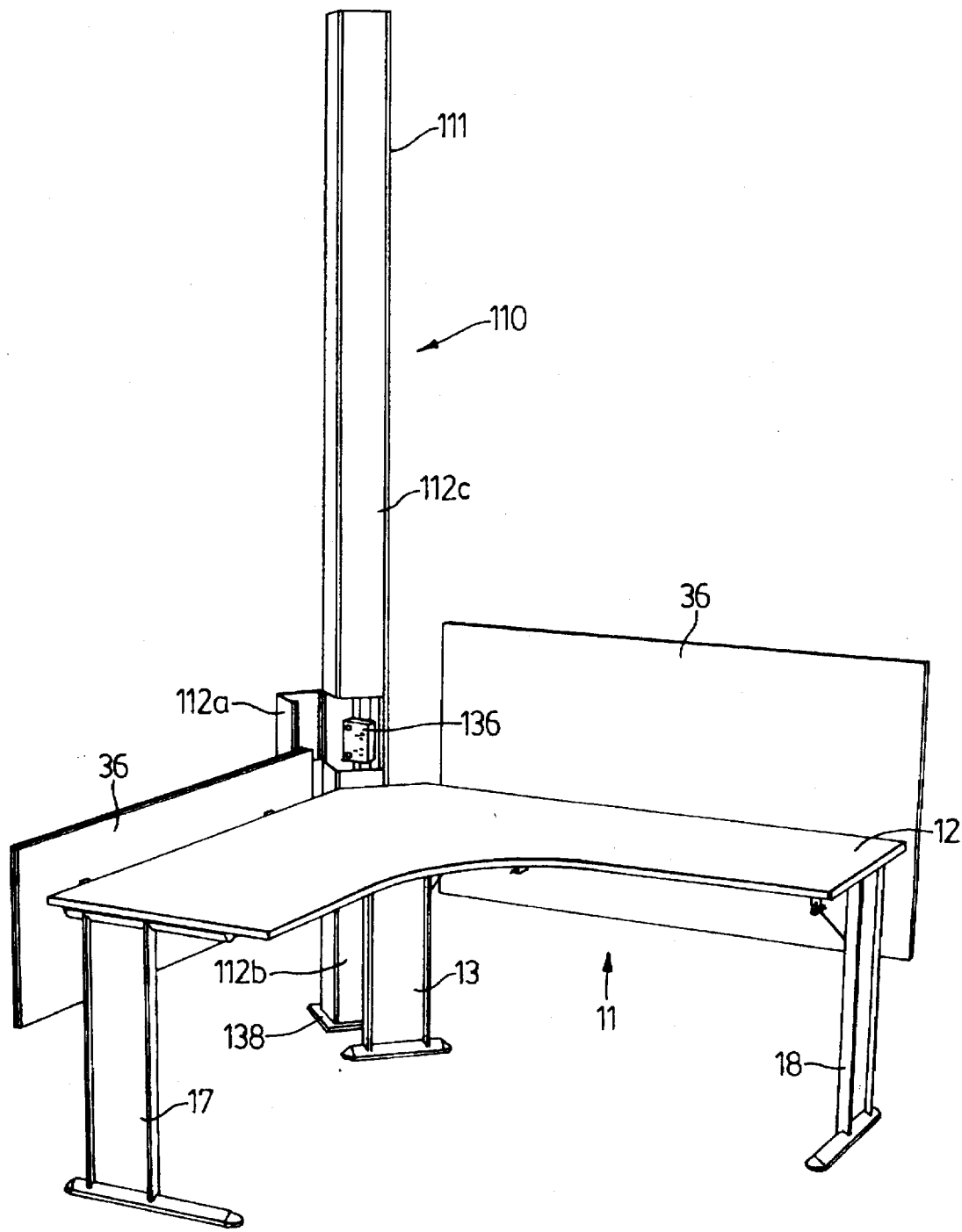
FIG. 9 is an isometric view of a workstation and a further modified column member in accordance with the invention.

FIG. 9 shows a workstation 11 as described above in detail with reference to FIGS. 1 to 5 used together with a further modified form of column member 110 comprising two opposed L-section extruded pieces 111 and 112, preferably of extruded aluminum that are placed in opposition to form a hollow square section member. In a preferred form, the pieces 111 and 112 are connected together pivotally to allow the pieces to pivot between a closed position shown in solid lines in FIG. 11 and an open position shown in broken lines, and also as indicated by arrow 100 for an intermediate section 112a in FIG. 10, wherein the interior of the column member 110 is revealed.

In order to provide the pivot connection, one extruded piece 111 has a C-section extruded channel-like socket 113 formed on an inner side of one edge portion 114. The other extruded piece 112 is formed with an integrally extruded part circular section bead-like hinge portion 116 that is received pivotally in the socket channel 113. The hinge portion 116 is formed adjacent an edge portion 117 of the piece 112 and is connected thereto through a laterally inwardly extending integrally extruded flange 118 arcuately concentric with the hinge portion 116 and with the socket portion 113 in the assembled condition and a laterally outwardly extending integrally extruded projection 119 terminating in a radially inwardly projecting portion 121 that connects to the hinge portion 116. This arrangement allows the piece 112 to be rotated through almost 90° between the open and closed positions, the extent of rotation being limited by the engagement of the projection 121 on outer lips 113a and 113b of the C-section socket 113.

Figure 11:
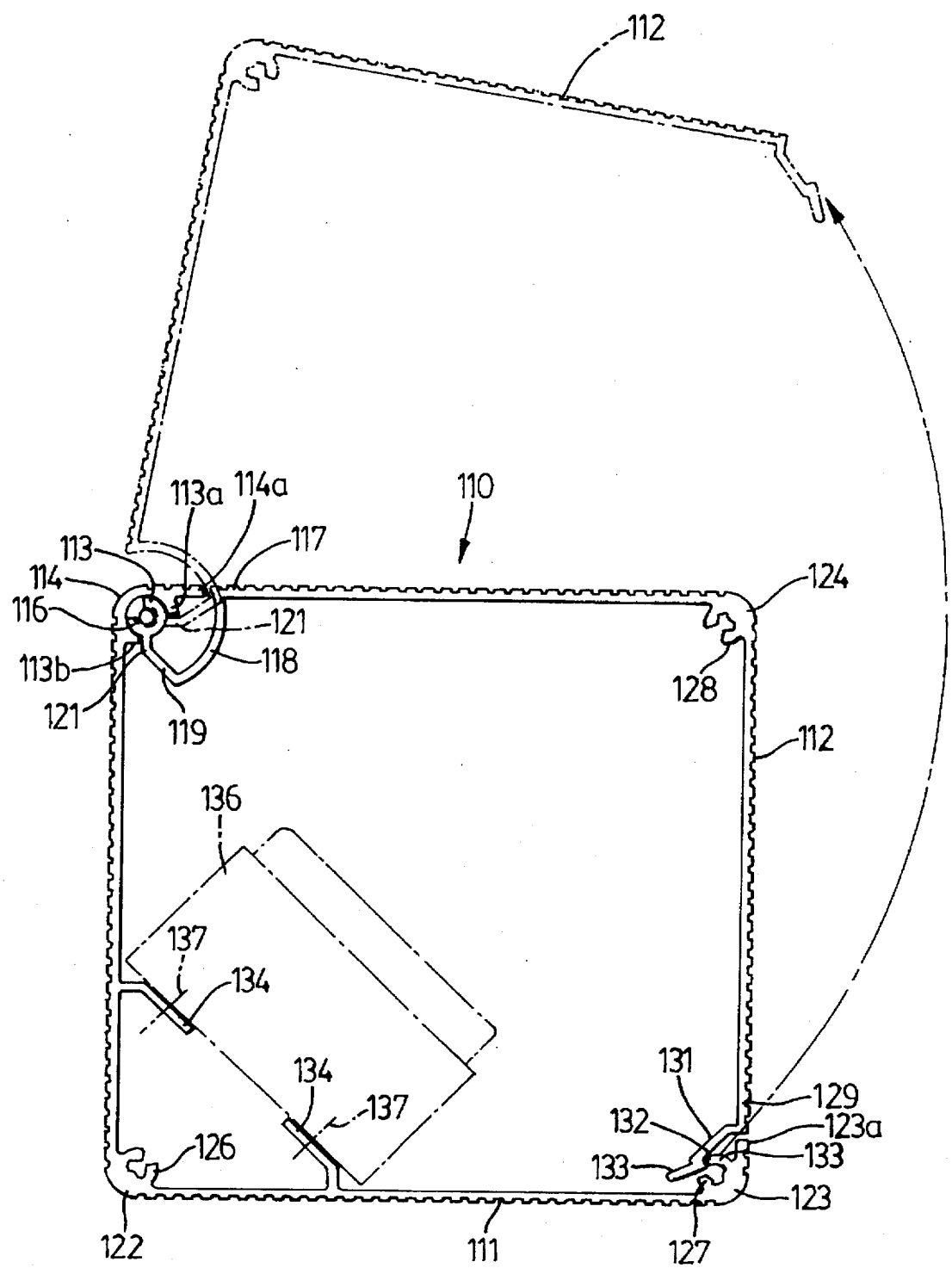
FIG. 11 is a bottom plan view of the column member of FIG. 9.

An apex 122 and opposite edge portion 123 of the piece 111 as well as an apex 124 of the other piece 112 are each formed on an inner side with screw bosses 126, 127 and 128, respectively. Such screw bosses comprise, as best seen in FIG. 11, C-section portions having lands projecting inwardly on the inner side of the C for engaging the thread of a screw when threaded axially into the recess of the screw boss. The inner side of the part circular section hinge portion 116 may similarly be formed with internally projecting lands so that it can also function as a screw boss. An edge portion 129 of the piece 112 adjacent the edge 123 in the closed position, as seen in FIG. 11, carries an integrally extruded laterally inwardly extending catch portion 131 having a laterally outwardly stepped portion 132 that catches on an end face of one limb 133 of the screw boss 127 in the closed position, as seen in FIG. 11. The catch portion 131 terminates in a laterally inwardly inclined latch arm 133.

Figure 10:
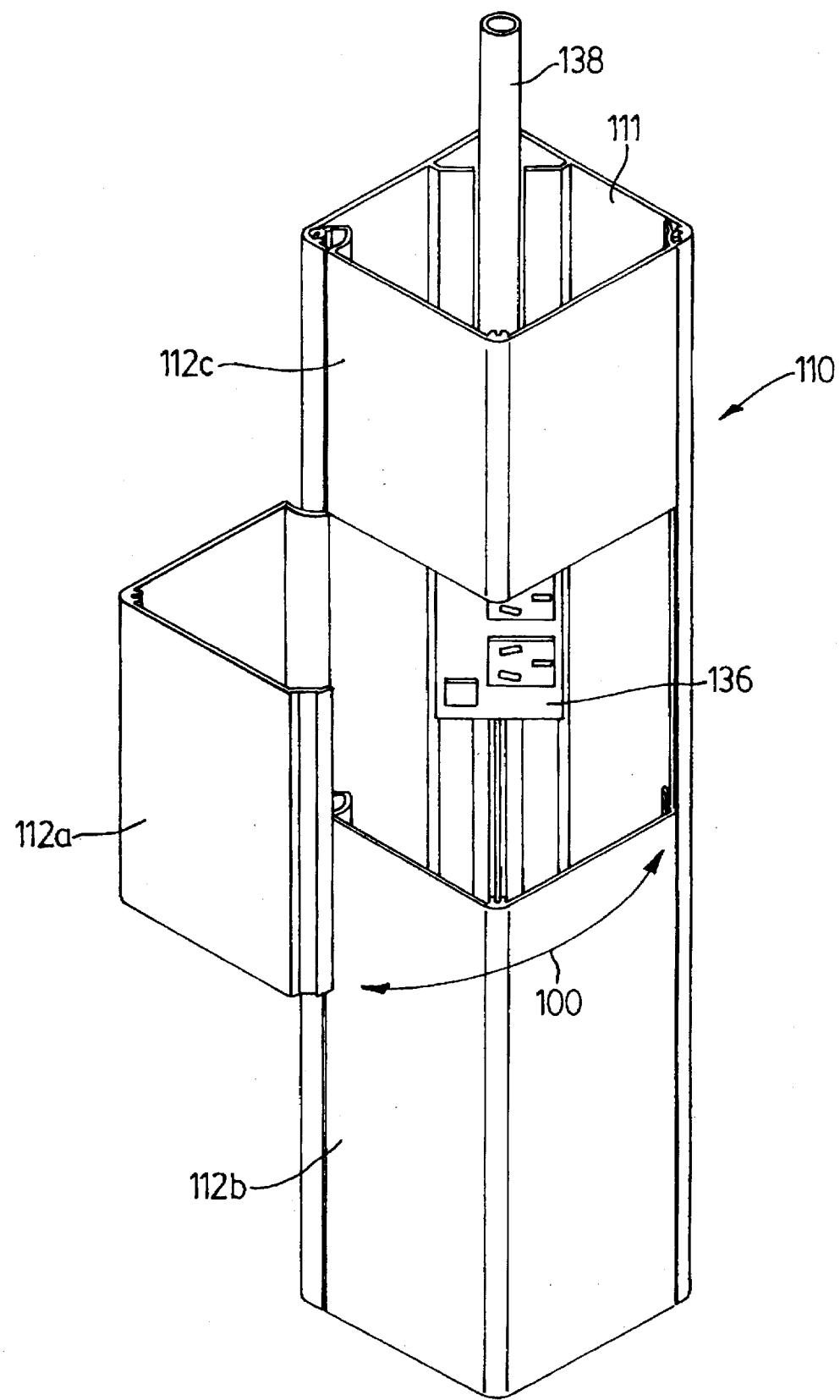
FIG. 10 is a partial isometric view on a larger scale of a portion of the column member of FIG. 9.

As seen in FIGS. 9 and 10, the column member 110 is assembled from a continuous length of the generally L-section extrusion 111 and three separate sections of the extrusion 112, namely a lower section 112b, an upper section 112c and the intermediate section 112a disposed between the sections 112b and 112c at approximately the height of the worktop 12 of the workstation 11 when the lower end of the column member rests on the floor. The sections 112a, 112b and 112c may be assembled to the continuous section 111 by sliding them axially longitudinally of the member 111 in the inserted position seen in cross-section in FIG. 11. Preferably, the sections 112a, 112b and 112c are snap-fitted to the continuous section 111, by pressing the sections toward the edge portion 114 so that the bead-like hinge portion 116 snap-fits into the C-section channel socket 113 in somewhat of an open position between the positions shown in solid and broken lines in FIG. 11. In the case of the longer sections 112c and 112b, this snap-fitting may take place progressively by first snap-fitting an upper portion of the part circular section bead-like hinge portion 116 into an upper portion of the C-section channel providing the socket 113 and then exerting pressure at progressively lower regions until the whole of the bead is received in the channel. The sections 112a, 112b and 112c may then be swung toward the closed position as seen in solid lines in FIG. 11 and hand pressure applied to the outer face of the piece 112 adjacent the edge 129 to deflect the latch arm 131 resiliently inwardly sufficiently to clear the catch edge 132. Again, with longer sections such as the sections 112b and 112a, this closure may be made progressively by exerting pressure from one end progressively along the length of the piece.

It may be noted that, adjacent the edge 114, the piece 112 terminates and the inwardly directed flange 118 commences at a distance spaced inwardly from the edge 114, so that the flange 118 is spaced well clear of the C-section socket 113. The edge 114 of the piece 111 is projected forwardly a small distance to provide an extension 114a which closes the gap except for a small clearance between the flange 114a and the forward face of the flange 118. Similarly adjacent the edge 123, the flange portion 131 extends from an edge of the piece 112 spaced inwardly from the edge 123, and there is a small flange extension 123a on the piece 111 that closes the gap except for a small clearance between the flange 131 and the end of the flange 123a. Preferably, the exterior of the pieces 111 and 112 is fluted with longitudinally extending rectangular section grooves as seen in FIG. 11, and the above noted clearances between the flanges 113a and 118 on the one hand and between flanges 131 and 123a on the other are of the same width as and coincide with the spacing of the grooves, so that the vertically extending gaps resulting from these clearances are concealed, at least from casual inspection.

In the preferred form, as best seen in FIG. 11, the L-section piece 111 has integrally extruded inwardly extending retaining flanges 134, these flanges 134 inclining laterally inwardly from respective limbs of the L and extending coplanar or substantially coplanar with one another while leaving a gap or spacing between their ends. Conveniently before applying the pieces 112a, 112b and 112c to the continuous section 111, the column member is provided internally with a power and data receptacle and outlet box 136 that may be attached with its planar rear surface abutting on the flanges 134 and secured thereto with fasteners passed through the flanges 134 along the lines of the axes indicated by broken lines 137 in FIG. 11. A conduit 138 of insulating material, for example plastic, may be run down the space on the inner side of the corner 122 rearwardly of the flanges 134 and terminated at the receptacle block 136 in the usual manner to enable cables carrying power and data to be run down the column member from a ceiling connection.

FIG. 9 shows the column member 110 connected at its lower end to a stabilizing square floor plate 138 which rests on or may be attached to the floor surface, the plate 138 being of somewhat larger dimensions than the cross-section of the column 110. The plate may be provided with holes in registry with the screw bosses 126, 127, 128 and with the interior of the screw boss interior of the hinge portion 116, and may be connected to the lower section with screws passed upwardly through the plate and threaded into the above mentioned screw bosses. This connection also serves to retain the lower section 112b in closed position relative to the continuous extruded piece 111.

A similar plate preferably apertured may be connected to the upper end of the column member 110 and serves to retain the upper section 112c against opening relative to the L-section piece 111.

In use, in order to access the receptacle block 136 a user of the workstation 11 can open the section 112a by applying hand pressure to a face of the section 112 adjacent the catch member 131 in order to deflect the catch member 131 inwardly sufficiently for the stepped portion 132 to clear the limb 133, after which the section 112a can be swung open to the position shown in broken lines in FIG. 11. If it is desired to disconnect from the receptacle 136 and close the section 112a, on closing movement the latch portion 133 rides over the outer side of the limb 133 and deflects the catch portion inwardly and on further closing movement the step portion 132 snaps over the limb 133 to retain the piece 112a in the closed position, as seen in solid lines in FIG. 11.

I claim:

1. A workstation comprising a one piece sheet form worktop having two limbs disposed in a general L shape having an outer apex and an inner corner, a central leg member pivotally connected to a lower side of the worktop adjacent said outer apex of said L shape for pivoting between a stored position extending diagonally across the lower side toward said inner corner thereof and an erected position extending downwardly from the worktop, an end leg member pivotally connected to the lower side adjacent each end of each limb and each pivoting between a stored position extending longitudinally across the lower side of the limb toward a central portion of said L shape and an erected position extending downwardly from the worktop, and means for securing said legs in their erected positions.

2. A workstation as claimed in claim 1 and in combination an auxiliary panel member adapted to be attached to an outer side of at least one limb of the worktop, and including hinged support members rocking from a flat folded position to a deployed position, and generally C and T section rails provided complimentarily on the auxiliary panel member and worktop, one of said C and T rails being provided on said hinged support members, said panel attaching to the worktop by inserting said T rail into said C rail with the hinged support members in deployed position.

3. A workstation as claimed in claim 2 including a releasable connector for retaining said T rail inserted in said C rail.

4. A workstation as claimed in claim 2 including a cable dump basket comprising a trough-shape frame adapted to be suspended between an adjacent pair of the support members in their deployed position, said frame having a longitudinally outwardly extending ear at each end for lodging on an upper edge of the adjacent support member.

5. In combination, a workstation as claimed in claim 1 and an upstanding column member of hollow rectangular cross-section for delivery of power and data therethrough to the workstation, said outer apex of the worktop being truncated and providing a recess having an oblique edge for accommodating a side of said column member.

6. The combination as claimed in claim 5 wherein said column member has a square cross-section.

7. The combination as claimed in claim 5 wherein the column member has an open top within which telescopes an upper tubular member having lateral flanges at its upper end adapted to rest on an upper side of a ceiling tile, whereby ceiling or floor fed power and data may be supplied to the workstation.

8. The combination as claimed in claim 5 wherein the column member has its upper end extending a short distance above the worktop, whereby floor fed power and data may be supplied to the workstation.

9. The combination as claimed in claim 5 wherein said column member comprises two opposed generally L-section extruded pieces having interengaging edge portions.

10. The combination as claimed in claim 9 wherein a first pair of said edge portions engage in a pivot connection to permit pivoting of said pieces between open and closed positions about an axis extending longitudinally of the column member.

11. The combination as claimed in claim 10 wherein one of said pieces comprises an intermediate section and at least one adjacent section, and said intermediate section is pivotable independently of said at least one adjacent section.

12. The combination as claimed in claim 10 wherein said pivot connection comprises a C-section extruded socket on an inner side of one edge portion of said first pair and the other edge portion of said pair comprises a laterally inwardly extending integrally extruded flange having a laterally outwardly extending integrally extruded projection thereon providing a part circular integrally extruded hinge portion adjacent its outer end received pivotably in said socket portion.

13. The combination as claimed in claim 12 wherein said hinge portion comprises a C-section screw boss.

14. The combination as claimed in claim 9 wherein a second pair of said edge portions comprise snap-engaging portions normally retaining said pieces in closed position.

15. The combination as claimed in claim 14 wherein said snap-engaging portions comprise a laterally inwardly extending catch portion extruded integrally on one edge portion of said second pair and a laterally resiliently deflectable laterally inwardly extending latch portion extruded integrally on the other edge portion of said second pair and normally engaging said catch portion.

16. The combination as claimed in claim 9 wherein one of said L-section pieces comprises, on an inner side of each limb of the L adjacent a corner portion thereof, an integrally extruded retaining flange inclining laterally inwardly, said retaining flanges extending substantially coplanar with each other.

17. The combination as claimed in claim 9 wherein each L-section piece has at least one integrally extruded screw boss on an inner side.

18. A column member of hollow rectangular cross-section for delivery of power and data to a workstation comprising two opposed L-section extruded pieces having interengaging edge portions wherein a first pair of said edge portions engage in a pivot connection to permit pivoting of said pieces between open and closed positions about an axis extending longitudinally of the column member and wherein one of said pieces comprises an intermediate section and at least one adjacent section, and said intermediate section is pivotable independently of said at least one adjacent section.

19. The column member as claimed in claim 18 wherein said pivot connection comprises a C-section extruded socket on an inner side of one edge portion of said first pair and the other edge portion of said pair comprises a laterally inwardly extending integrally extruded flange having a laterally outwardly extending integrally extruded projection thereon providing a part circular integrally extruded hinge portion adjacent its outer end received pivotably in said socket portion.

20. The column member as claimed in claim 19 wherein said hinge portion snap fits in said socket.

21. The column member nation as claimed in claim 18 wherein a second pair of said edge portions comprise snap-engaging portions normally retaining said pieces in closed position.

22. The column member as claimed in claim 21 wherein said snap-engaging portions comprise a laterally inwardly extending catch portion extruded integrally on one edge portion of said second pair and a laterally resiliently deflectable laterally inwardly extending latch portion extruded integrally on the other edge portion of said second pair and normally engaging said catch portion.

23. The column member as claimed in claim 18 wherein one of said L-section pieces comprises, on an inner side of each limb of the L adjacent a corner portion thereof, an integrally extruded retaining flange inclining laterally inwardly, said retaining flange extending substantially coplanar with each other.

24. The column member as claimed in claim 18 wherein each L-section piece has at least one integrally extruded screw boss on an inner side.

\* \* \* \* \*